Aug. 8, 1933.    R. B. POGUE    1,921,838

BRAKE SHOE

Original Filed May 31, 1930

Inventor:
Robert B. Pogue
By: W. D. Bell
Atty.

Patented Aug. 8, 1933

1,921,838

UNITED STATES PATENT OFFICE 1,921,838

BRAKE SHOE

Robert B. Pogue, Orange, N. J., assignor to The American Brake Shoe and Foundry Company, Wilmington, Del., a Corporation of Delaware Original application May 31, 1930, Serial No. 457,813. Divided and this application January 7, 1932. Serial No. 585,343

9 Claims. (Cl. 188—258)

This is a division of my application Serial No. 457,813, filed May 31, 1930.

The object of the invention is to prepare a reenforce back for embedment in the body of a brake shoe by a treatment which will protect it where treated against adhering in intimate contact with the body.

Another object of the invention is to apply a protective coating to portions of a reenforce back to be embedded in the body of a brake shoe to prevent those portions from adhering in intimate contact with the body.

And a further object of the invention is to protect the intermediate portion of a reenforce back for a brake shoe, between its ends, with a protective coating so that when the back is embedded in the body of the shoe in the casting operation the uncoated end portions of the back will be securely held in intimate contact with the body but the intermediate portion will be protected by the coating against intimate contact with the body.

I have illustrated a selected embodiment of the invention in the accompanying drawing in which Fig. 1 shows how the reenforce back may be coated with oil preliminary to receiving a coating of refractory material.

Figure 1:
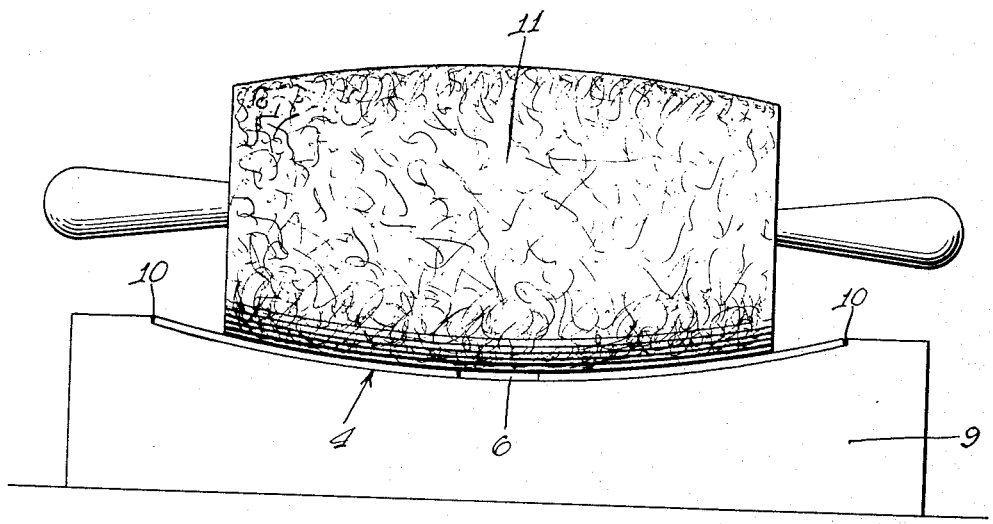
Figure 2:
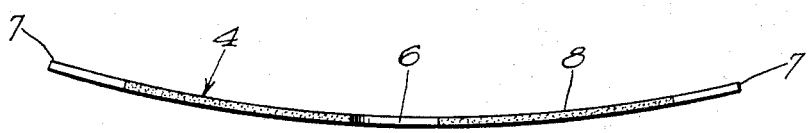
Fig. 2 is an edge view of the reenforce back.
Figure 3:
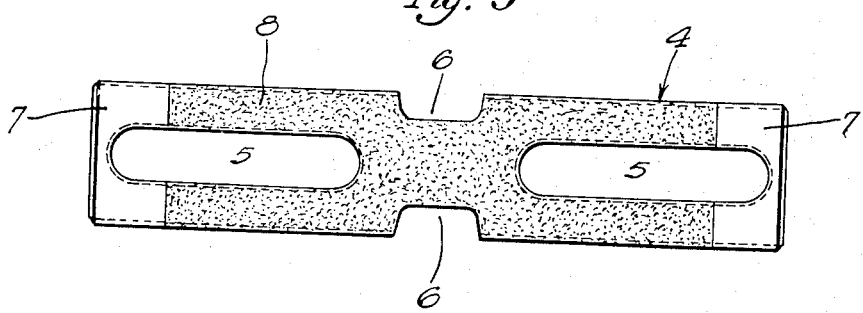
Fig. 3 is a plan view of the reenforce back with the coating applied thereto.

Reenforce backs have been made usually of ductile metal and are commonly called "steel backs." They comprise rods, bars or plates, and the plates have been perforated, slotted or cut out in a variety of skeleton forms. It has been proposed also to make the backs of expanded metal and other mesh material. For the purposes of this application I have selected a plate back 4 having slots 5, 5 to receive the metal of the body for anchoring the plate to the body, and cut-outs 6, 6 to receive the legs of an attaching lug strap. The invention may be employed in connection with any of the other types of backs so far as my invention is or may be adapted thereto. In my original application aforesaid I claim a brake shoe having a reenforce back embedded therein with its end portions rigidly secured in the end portions of the body of the shoe and its intermediate portion free from intimate contact with the body so as to be capable of a limited vibration movement relative to the body when the shoe is in service. This application covers the reenforce back, as an article of manufacture, and the method of protecting it so that it can be placed in a brake shoe mold and embedded in the body of the shoe during the casting operation with its end portions secured in the body against relative movement and its intermediate portion between said end portions free from adhering in intimate contact with the body so that vibration strains on the back after the body has been fractured will be distributed over the back for a considerable distance from the fracture.

I apply to the intermediate portion of the back between the end portions 7, 7 which are rigidly and firmly secured to the body in the casting operation, a sufficient coating 8 of refractory material to keep the intermediate portion of the back free from intimate contact with the body of the shoe. I may use a coating of oil and silica or other coating suitable for the purpose and I have indicated the coating by stippling. It is desirable to provide a light coating of refractory material to the end portions 7, 7 of the reenforce back to prevent them from burning in the casting operation but this light coating should not be sufficient to prevent the back from becoming rigidly secured to the body in the casting operation whereas the coating 8 on the intermediate portion of the back should be sufficiently heavy to ensure that this intermediate portion will not become rigidly secured to the body. The back is anchored to the body by the body metal which fills the slots 5, 5 and passes through parts of these slots to connect with the guide lugs of the shoe, and the marginal edges of the back and the edges about the slots may be bevelled to permit the body metal to anchor therewith. In practice I apply a coating of oil to the inner face of the reenforce back and then dip the back in silica flour. It is customary to coat the plate lightly with oil to lubricate the punches which blank the reenforce back from the plate, and this oil will hold a light coating of silica flour on the end portions of the back but will not hold a sufficient coating on the intermediate portion. After the back is punched and formed to proper radius I coat it between its ends with oil of high viscosity which will hold a comparatively thick coating of the silica flour at least sufficient to prevent this intermediate part of the reenforce back from adhering in intimate contact with the cast body. The oil may be applied to the intermediate part of the reenforce back by placing the back 4 upon a bed 9 between shoulders 10 and applying the oil to the back by means of a felt or other suitable roller 11. The back is placed on the bed with its inner concave face uppermost and the bed is shaped between the shoulders 10, 10 to receive the back. The roller is preferably shaped to fit the concave face of the back and it may be supplied with oil in any suitable manner. A plurality of backs may be placed on the base side by side and the roller may be rolled thereover under pressure to apply a coating of sufficient thickness to the reenforce backs. When plate backs are embedded in a shoe the outer convex face will be exposed at the back of the shoe between the lugs at the ends thereof and the center attaching lug, and therefore it is not important that the heavy coating of refractory material should be applied to any part of the outer convex face of the back which will be exposed in the shoe. Sufficient oil will flow over the marginal edges of the back and the edges of the slots to coat these edges. Surplus oil will drain toward the center of the bed and away from the ends of the back and, since the roller is not of sufficient length to engage the end portions of the back, these end portions will not receive the coating of oil which is provided to hold the thick coating of silica flour. The completely coated back will have the usual light coating of refractory material on the end portions of the back and a heavy coating of refractory material on the intermediate portion of the back and this heavy coating of refractory material should be provided on the intermediate portion of the back wherever it contacts with the cast iron of the body but it is not necessary at other places. I have indicated the intermediate heavily coated portion of the back as extending to or about where the inner ends of the guide lugs of the shoe would extend but the size of the intermediate end portions may be varied as found desirable. I prefer to make the intermediate heavily coated portion as long as possible consistent with the provision of end portions not heavily coated of sufficient length to secure the back at the end portions rigid within the body. I have shown my invention embodied in a reenforce back of simple plate type for use in plain cast iron shoes with or without inserts in the wearing face, and of any size, form or construction; but the invention may be used with other kinds of backs, including flanged backs. I do not aim to define within absolute limits that portion of the back which receives the heavy protective coating because I believe it is desirable to make this portion as long as possible and the proportions of the intermediate and end portions may be varied to suit different conditions as will be readily understood by those skilled in the art. Any suitable oil which will hold the heavy coating of refractory material may be used and any other refractory material than silica flour which may be suitable for the purpose may be used.

I claim:

1. A brake shoe reenforce back having a coating of refractory material thereon to protect the coated part of the back from becoming embedded in intimate contact with the body during the casting of the shoe.

2. A brake shoe reenforce back having a coating of refractory material thereon spaced from its ends to protect the coated part of the back from becoming embedded in intimate contact with the body during the casting of the shoe.

3. A brake shoe reenforce back having a heavy coating of refractory material thereon to protect the coated part of the back from becoming embedded in intimate contact with the body during the casting of the shoe.

4. A brake shoe reenforce back having a heavy coating of refractory material thereon spaced from its ends to protect the coated part of the back from becoming embedded in intimate contact with the body during the casting of the shoe.

5. A brake shoe reenforce back having a light coating of refractory material on its end portions and a heavy coating of refractory material between its end portions whereby the end portions will become embedded in intimate contact with the body during the casting of the shoe but the intermediate portion will not become embedded in intimate contact with the body during the casting of the shoe.

6. The herein described method of preparing a reenforce back for embedment in a brake shoe during the casting operation which consists in applying a protective coating to the back where it is desired that the back shall not be embedded in intimate contact with the body.

7. The herein described method of preparing a reenforce back for embedment in a brake shoe during the casting operation which consists in applying a thick coating of refractory material to the back where it is desired that the back shall not be embedded in intimate contact with the body.

8. The herein described method of preparing a reenforce back for embedment in a brake shoe during the casting operation which consists in applying a protective coating to the intermediate portion of the back, leaving the ends free from said protective coating, so that the back will not be embedded in intimate contact with the body of the shoe during the casting operation where the back is provided with the protective coating but will be embedded in intimate contact with the body of the shoe at the ends of the back.

9. The herein described method of preparing a reenforce back for embedment in a brake shoe during the casting operation which consists in applying a coating of oil and a coating of refractory material to the back to protect the coated part of the back from becoming embedded in intimate contact with the body during the casting of the shoe.

ROBERT B. POGUE.